Dec. 5, 1950      R. C. HAWKINS      2,532,717
PICKUP TRUCK WITH AUTOMATIC TILT
Filed June 24, 1947
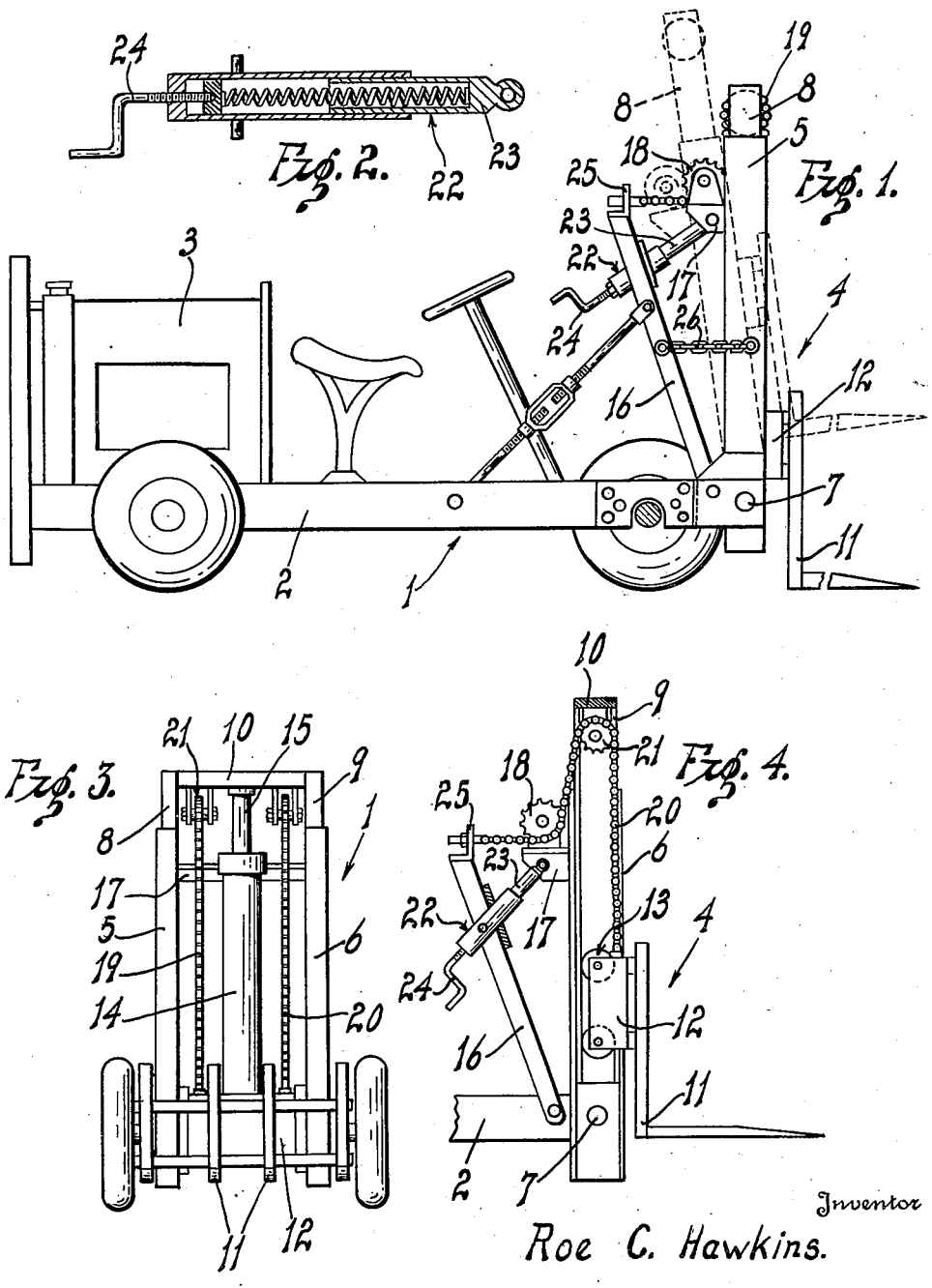
Inventor
Roe C. Hawkins.
By H. A. Druckman
Attorney Patented Dec. 5, 1950

2,532,717

UNITED STATES PATENT OFFICE 2,532,717

PICKUP TRUCK WITH AUTOMATIC TILT

Roe C. Hawkins, Long Beach, Calif.

Application June 24, 1947, Serial No. 756,751

7 Claims. (Cl. 214—113)

This invention relates to a pickup truck of the type used in warehouses and the like, and where it is necessary to lift heavy objects off of the floor or from the floor level to a higher position, for example, where objects are stacked one on the other.

An object of my invention is to provide a novel pickup truck in which the pickup fingers and the mounting frame therefor will automatically tilt rearwardly whenever there is a load on the fingers.

A feature of my invention is to provide a novel pickup truck in which the fingers and the co-acting frame therefor will tilt rearwardly at an angle as soon as the fingers are moved upwardly with the load thereon, and the fingers and frame will remain at a tilted position until the load is removed.

Another object of my invention is to provide a novel pickup truck in which the tilting of the fingers and the co-acting frame is accomplished by transmitting the weight of the load on the fingers to a horizontal force component, this force component being transmitted through a chain.

A feature of my invention resides in the novel spring arrangement whereby the fingers and the frame are returned to a vertical position as soon as the load has been removed from the fingers.

Other objects, advantages and features of invention appear from the accompanying drawing, the subjoined detailed description and the appended claims.

In the drawing—

Figure 1 is a side elevation of my pickup truck.

Figure 2 is a longitudinal sectional view of the return spring.

Figure 3 is a front elevation of my pickup truck.

Figure 4 is a vertical sectional view of the pickup fingers and frame.

Referring more particularly to the drawing, my pickup truck 1 consists of a chassis 2 upon which the usual engine 3 is mounted to move the truck and also to actuate the hydraulic mechanism by means of which the pickup fingers are moved vertically, all of which will be subsequently described.

The pickup fingers assembly 4 consists of a frame including a pair of channels 5, 6, both of which are pivoted to the forward end of the chassis 2, as shown at 7. Slides 8, 9 move vertically in the channels 5, 6, and these slides are connected at the top by the cross bar 10 to form a substantially rigid frame.

The load carrying fingers 11 are fixedly mounted on a carriage 12, which carriage moves on wheels 13 in the slides 8 and 9. A hydraulic cylinder 14 is provided with the usual piston rod 15, which bears against the top plate 9, and thus moving the slides 8, 9 upwardly to actuate the load bearing fingers 11, as will be further described.

A back rest 16 is rigidly mounted on the chassis 2, and this back rest is inclined rearwardly at an angle. A bracket 17 extends between the channel guides 5, 6, and at the rear thereof, this bracket acting as a support for a pair of sprockets 18, 18. These sprockets are freely rotatable on the bracket 17.

A pair of chains 19, 20 are each fixedly attached at one end to the back rest 16, each chain passes under a sprocket 17, over a sprocket 21, and thence downwardly to where the chain is fixedly attached to the carriage 12. The sprockets 21 are mounted on the head plate 10, or to the slides 8, 9, whichever is most desirable.

A return spring assembly 22 consists of a spring pressed plunger 23, which is pivotly attached to the bracket 17. The tension of the spring on the plunger 23 may be varied by the crank 24.

This spring urges the channels 5, 6 towards a vertical position and the tension of this spring is overcome by the horizontal force component on the chains 19, 20, all of which will be further described.

Operation

In operation the fingers 11 are first placed at floor level and the channels 5, 6 are vertical. The load is then placed on the fingers 11, after which the hydraulic cylinder 14 is actuated causing the slides 8, 9 to move upwardly. This places a tension on the chains 19, 20, causing the carriage 12, and the fingers 11, to move upwardly. The force applied to the chains 19, 20 is exerted on the fixed attachment 25, and it will be noted that there will be a horizontal component of force at this point. This force causes the channels 5, 6, the slides 8, 9, and the fingers 11, to tilt rearwardly to the position shown in dotted lines in Figure 1.

This tilting of the above members will occur as soon as the load starts to move upwardly. The load is then lifted to the desired height at which point it is removed. As soon as the load is removed the spring plunger 23 returns the parts to a vertical position. The slides 5, 6 are limited in their swinging movement by the check chain 26.

Having described my invention, I claim:

1. An automatic tilting pickup truck comprising, vertically movable and tiltable slides, load fingers mounted in said slides and means attached at one end to the load fingers and at the other end to a stationary part, spaced from the load fingers said attachment to the stationary part being substantially horizontal and spring return means engaging the slides and urging said slides into vertical position.

2. An automatic tilting pickup truck comprising, a pair of spaced channels, means pivotly mounting said channels on the truck, load fingers means slidably mounting said fingers in the channels and means attached at one end to the load fingers and at the other end to a stationary part, spaced from the load fingers said attachment to the stationary part being substantially horizontal, and spring return means engaging the slides and urging said slides into vertical position.

3. An automatic tilting pickup truck comprising, a pair of spaced channels, means pivotly mounting said channels on the truck, a slide in each channel, load fingers mounted in said slides and flexible means attached at one end to the load fingers and at the other end to a stationary part, spaced from the load fingers said attachment to the stationary part being substantially horizontal, and spring return means engaging the slides and urging said slides into vertical position.

4. An automatic tilting pickup truck comprising, a pair of spaced channels, means pivotly mounting said channels on the truck, a slide in each channel, load fingers mounted in said slides, a chain attached at one end to the load fingers and at the other end to a stationary back rest, spaced from the load fingers and a sprocket mounted on the slides, said chain passing over the sprocket.

5. An automatic tilting pickup truck comprising, a pair of space channels, means pivotly mounting said channels on the truck, a slide in each channel, load fingers mounted in said slides, a chain attached at one end to the load fingers and at the other end to a stationary back rest, spaced from the load fingers and a sprocket mounted on the slides, said chain passing over the sprocket and power means connected to said slides to move the load fingers.

6. An automatic tilting pickup truck comprising, a pair of spaced channels, means pivotly mounting said channels on the truck, a slide in each channel, load fingers mounted in said slides, a chain attached at one end to the load fingers and at the other end to a stationary back rest spaced from the load fingers, a sprocket mounted on the slides, guide means to direct the chain horizontally to the back rest, said chain passes over the sprocket and over said guide means.

7. An automatic tilting pickup truck comprising, a pair of spaced channels, means pivotly mounting said channels on the truck, a slide in each channel, load fingers mounted in said slides, a chain attached at one end to the load fingers and at the other end to a stationary back rest spaced from the load fingers, a sprocket mounted on the slides, guide means to direct the chain horizontally to the back rest, said chain passes over the sprocket and over said guide means, and power means connected to said slides to move the load fingers.

ROE C. HAWKINS.

REFERENCES CITED

The following references are of record in the file of this patent:

UNITED STATES PATENTS

| Number | Name | Date |
|---|---|---|
| 377,183 | White | Jan. 31, 1888 |
| 1,369,165 | Cochran et al. | Feb. 22, 1921 |
| 2,169,440 | Weiss | Aug. 15, 1939 |
| 2,208,954 | Weiss | July 23, 1940 |
| 2,220,450 | Howell | Nov. 5, 1940 |
| 2,261,930 | Abbe | Nov. 11, 1941 |
| 2,264,527 | Hawkins | Dec. 2, 1941 |
| 2,339,020 | Le Tourneau | Jan. 11, 1944 |
| 2,349,352 | Johnson | May 23, 1944 |
| 2,415,014 | Luebbers | Jan. 28, 1947 |
| 2,441,070 | Hoover | May 4, 1948 |
| 2,494,651 | Flynn | Jan. 17, 1950 |
| 2,506,242 | Shoemaker | May 2, 1950 |